United States Patent
Gu et al.

(10) Patent No.: US 10,482,850 B2
(45) Date of Patent: *Nov. 19, 2019

(54) METHOD AND VIRTUAL REALITY DEVICE FOR IMPROVING IMAGE QUALITY

(71) Applicant: VIA Alliance Semiconductor Co., Ltd., Shanghai (CN)

(72) Inventors: Deming Gu, Shanghai (CN); Fengxia Wu, Shanghai (CN); Huaisheng Zhang, Shanghai (CN); Wei Zhang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 33 days.

This patent is subject to a terminal disclaimer.

(21) Appl. No.: 15/626,350

(22) Filed: Jun. 19, 2017

(65) Prior Publication Data

US 2018/0336867 A1    Nov. 22, 2018

(30) Foreign Application Priority Data

May 18, 2017 (CN) .......................... 2017 1 0351562

(51) Int. Cl.
*G09G 5/391*    (2006.01)

(52) U.S. Cl.
CPC ..... *G09G 5/391* (2013.01); *G09G 2340/0407* (2013.01); *G09G 2340/16* (2013.01)

(58) Field of Classification Search
None
See application file for complete search history.

(56) References Cited

U.S. PATENT DOCUMENTS

| 6,501,483 | B1 | 12/2002 | Wong et al. | |
|---|---|---|---|---|
| 9,317,764 | B2 | 4/2016 | Baheti et al. | |
| 2007/0008333 | A1 | 1/2007 | Xu | |
| 2007/0188624 | A1 | 8/2007 | Zhang | |
| 2009/0091648 | A1 | 4/2009 | Lin et al. | |
| 2015/0193959 | A1* | 7/2015 | Shah | G06F 3/00 345/473 |
| 2015/0348493 | A1* | 12/2015 | Chae | G09G 5/00 345/212 |
| 2018/0075584 | A1* | 3/2018 | Akenine-Moller | G06T 5/002 |

FOREIGN PATENT DOCUMENTS

| CN | 10226631 | B | 6/2010 |
|---|---|---|---|
| CN | 101504766 | B | 9/2011 |
| CN | 104871180 | A | 8/2015 |
| CN | 105659582 | A | 6/2016 |
| CN | 105981384 | A | 9/2016 |
| TW | 200703141 | A | 1/2007 |
| TW | 200731760 | A | 8/2007 |

* cited by examiner

*Primary Examiner* — Kyle Zhai
(74) *Attorney, Agent, or Firm* — McClure, Qualey & Rodack, LLP

(57) ABSTRACT

A method for improving image quality is provided. The method includes: receiving an image data and sensing information; dividing the image data into areas corresponding to different resolutions according to first parameter information, wherein the different resolutions correspond to different frequencies; rendering the areas in a single pass according to the sensing information and the different frequencies and outputting a rendered image data; and resolving the rendered image data into a final output image data with a first resolution according to second parameter information.

20 Claims, 7 Drawing Sheets

METHOD AND VIRTUAL REALITY DEVICE FOR IMPROVING IMAGE QUALITY

CROSS REFERENCE TO RELATED APPLICATIONS

This application claims priority to Chinese Patent Application No. 201710351562.4 filed on May 18, 2017 in the China Intellectual Property Office, the contents of which are incorporated by reference herein.

BACKGROUND OF THE INVENTION

Field of the Invention

Aspects of the present disclosure relate generally to the field of graphics processing, and more particularly, to a method and a virtual reality device for improving image quality by using sensors.

Description of the Related Art

Aliasing is a fundamental problem in computer graphics. Anti-aliasing alleviates the problem of aliasing, or high-frequency noise due to undersampling. Current anti-aliasing techniques are typically used for real-time rendering.

Several approaches to anti-aliasing have been developed. Known solutions typically employ a box filter over pixel sub-samples, which provides some improvement in the displayed result. Two popular approaches to anti-aliasing on modern graphics hardware are supersampling and multisample anti-aliasing (MSAA). Supersampling is typically performed by rendering the scene at a higher resolution and then downsampling to the target resolution. Supersampling is expensive in terms of both performance and memory bandwidth, however the results tend to have a high quality since the entire scene is rendered at a higher resolution. Downsampling is performed in a processing step called a resolve, which is the aggregation of the samples with filtering. MSAA is an alternative to supersampling and is the predominant method of anti-aliasing for real-time graphics on current consumer GPUs. A third approach was also recently introduced, called coverage sampling which aims to produce a quality level similar to MSAA but with a reduced memory requirement.

But existing anti-aliasing techniques lack adequate pixel accuracies and are less temporally stable. They also cause perceptible blurring to textures, since it is difficult for edge detection to distinguish between intentional color discontinuities and unwanted aliasing caused by imperfect rendering. Although each of these techniques can be adjusted, depending on speed and quality requirements, making minor adjustments to the entire graphics pixel pipeline to optimize quality is inefficient.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a virtual reality device for improving image quality are provided in the disclosure.

In a preferred embodiment, the disclosure is directed to a method for improving image quality, comprising: receiving an image data and sensing information; dividing the image data into areas corresponding to different resolutions according to first parameter information, wherein the different resolutions correspond to different frequencies; rendering the areas in a single pass according to the sensing information and the different frequencies and outputting a rendered image data; and resolving the rendered image data into a final output image data with a first resolution according to second parameter information.

In a preferred embodiment, the disclosure is directed to a virtual reality device for improving image quality. The virtual reality device comprises a graphics processing unit and a memory. The memory is operatively coupled to the graphics processing unit. The graphics processing unit is configured to execute a program code stored in the memory to execute: receiving an image data and sensing information; dividing the image data into areas corresponding to different resolutions according to first parameter information, wherein the different resolutions correspond to different frequencies; rendering the areas in a single pass according to the sensing information and the different frequencies and outputting a rendered image data; and resolving the rendered image data into a final output image data with a first resolution according to second parameter information.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure

DETAILED DESCRIPTION OF THE INVENTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The term "application" as used herein is intended to encompass executable and non-executable software files, raw data, aggregated data, patches, and other code segments. Furthermore, like numerals refer to like elements throughout the several views, and the articles "a" and "the" includes plural references, unless otherwise specified in the description.

Figure 1:
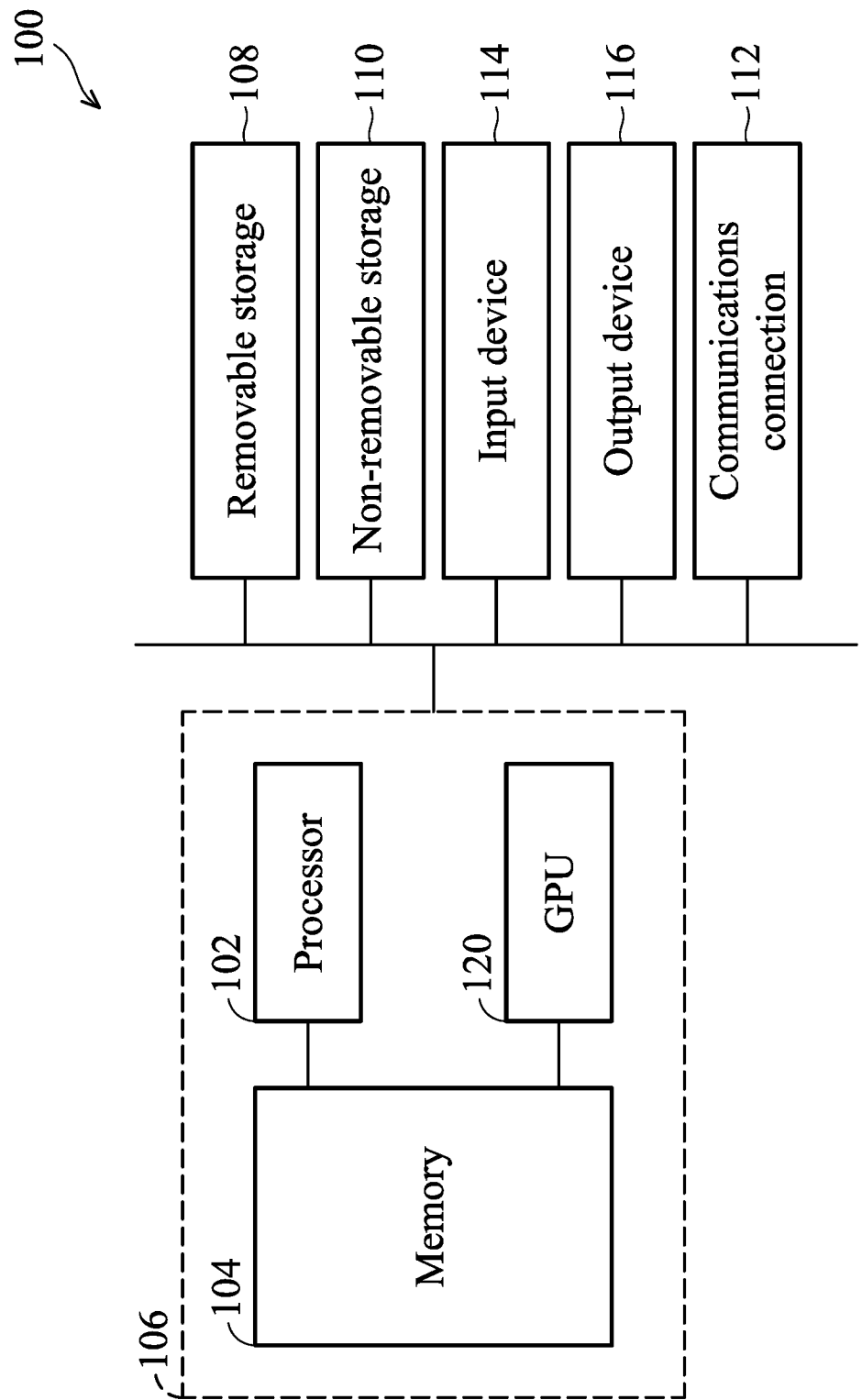
FIG. 1 shows a schematic diagram of an example electrical device according to one embodiment of the present disclosure.

FIG. 1 shows a schematic diagram of an example electrical device 100 according to one embodiment of the present disclosure.

The following description is intended to provide a brief, general description of a suitable electrical device with which such a system can be implemented. The electrical device can be any of a variety of general purpose or special purpose computing hardware configurations. Examples of well-known electrical devices that may be suitable include, but are not limited to, game consoles, set top boxes, personal computers, hand-held or laptop devices (for example, media players, notebook computers, cellular phones, personal data assistants, voice recorders), server computers, multiprocessor systems, microprocessor-based systems, programmable consumer electronics, network PCs, minicomputers, mainframe computers, distributed computing environments that include any of the above systems or devices, and the like.

With reference to FIG. 1, an example electrical device 100, in a basic configuration, includes at least one processor 102 and memory 104. The electrical device can have multiple processors 102. A processor 102 can include one or more processing cores (not shown) that operate independently of each other. Additional co-processing units, such as graphics processing unit (GPU) 120, also are provided. Depending on the configuration and type of electrical device, memory 104 may be volatile (such as RAM), non-volatile (such as ROM, flash memory, etc.) or some combination of the two. This configuration is illustrated in FIG. 1 by dashed line 106.

The electrical device 100 may have additional features and functionality. For example, the electrical device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. The memory 104, the removable storage 108 and the non-removable storage 110 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices. A storage medium is any medium in which data can be stored in and retrieved from addressable physical storage locations by the electrical device.

The electrical device 100 may also contain communications connection(s) 112 that allow the device to communicate with other devices over a communication medium. The communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The communications connections 112 are devices that interface with the communication media to transmit data over and receive data from communication media, such as a network interface.

The electrical device 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on an electrical device generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The electrical device 100 can also include, couple with, or be integrated within a wearable device, such as a smart watch wearable device, augmented reality device, or virtual reality device.

Figure 2:
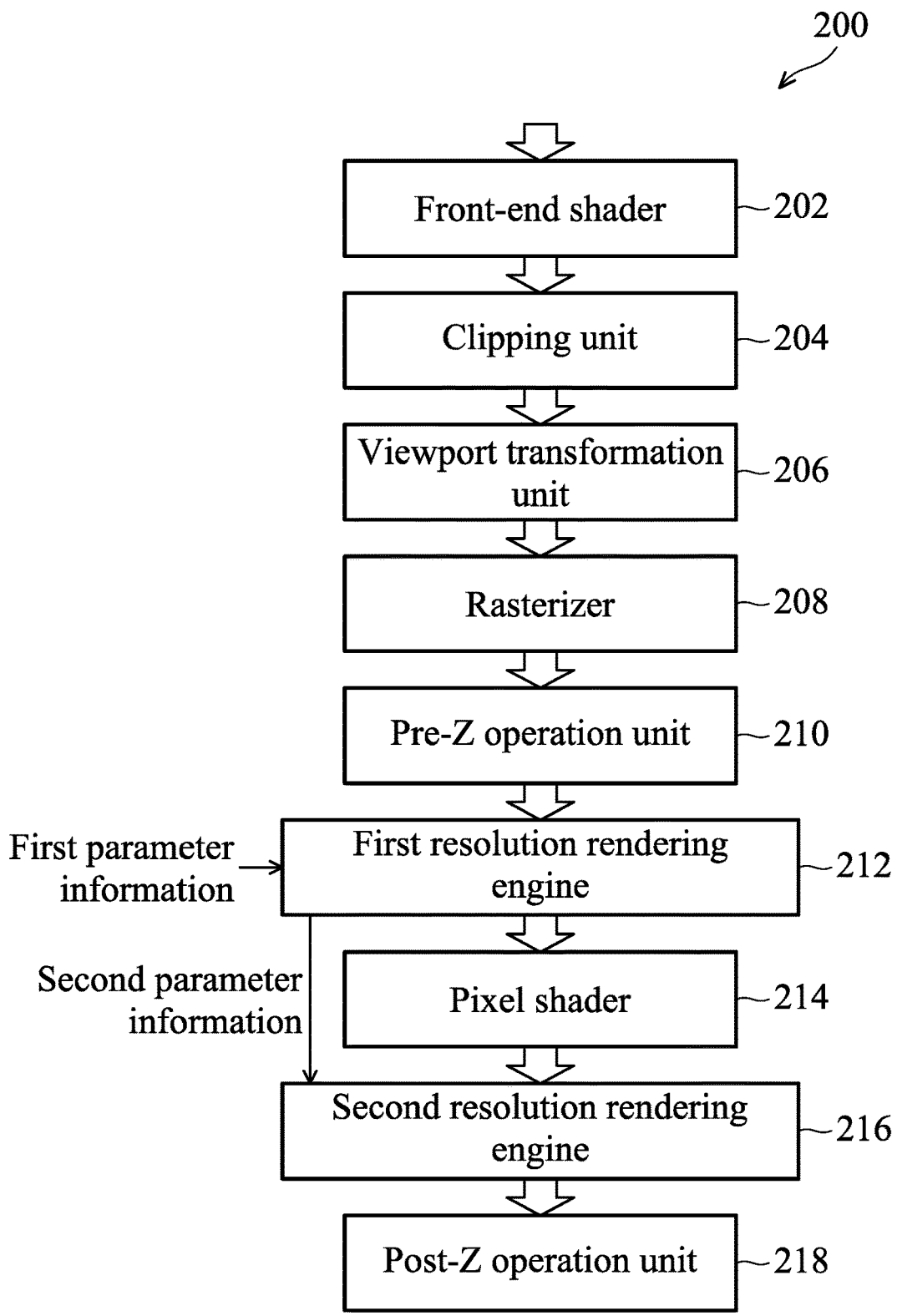
FIG. 2 shows a schematic diagram of a graphics rendering pipeline according to one embodiment of the present disclosure.

FIG. 2 shows a schematic diagram of a graphics rendering pipeline 200 according to one embodiment of the present disclosure. By way of example, the pipeline 200 could be part of the internal structure of the electronic device illustrated in FIG. 1. The pipeline 200 includes a front-end shader 202, a clipping unit 204, a viewport transformation unit 206, a rasterizer 208, a pre-Z operation unit 210, a first resolution rendering engine 212, a pixel shader 214, a second resolution rendering engine 216 and a post-Z operation unit 218.

The front-end shader 202 comprises computer program logic that performs the last set of operations for graphics rendering on graphics hardware. For example, the front-end shader 202 can be a vertex shader, a geometry shader, etc.

The clipping unit 204 may perform clipping operation on an original image data. The viewport transformation unit 206 may perform correction and viewport scaling operations on the original image data. The rasterizer 208 identifies the positions of all of the pixels within the image data and outputs a rasterized image data, wherein the rasterized image data has a first resolution. The pre-Z operation unit 210 may provide a pre-shader Z/stencil buffer testing.

The first resolution rendering engine 212 may receive the rasterized image data transmitted from the rasterizer 208 and divide the rasterized image data into areas corresponding to different resolutions according to first parameter information transmitted by a driver or an user interface, wherein the first parameter information can at least include screen coordinate information and distance information, and the resolutions correspond to different frequencies. For example, if an area A requires a higher quality requirement or a resolution corresponding to the area A is within a range of high resolutions (i.e., the high resolution is required), the frequency corresponding to the high resolution is a sampling frequency. If the quality requirement required in an area B is intermediate or a resolution corresponding to the area B is within a range of intermediate resolutions (i.e., the intermediate resolution is required), the frequency corresponding to the intermediate resolution is a pixel frequency. If an area C does not require any quality requirement or the resolution corresponding to the area C is within a range of low resolutions (i.e., the low resolution is required), the frequency corresponding to the low resolution is a quad rendering frequency.

The first resolution rendering engine 212 transmits a signal to the pixel shader 214 to indicate that the different areas are rendered by using frequencies corresponding to different resolutions. Then, the first resolution rendering engine 212 further transmits second parameter information to the second resolution rendering engine 216, wherein the second parameter information at least includes the first resolution.

The pixel shader 214 may render the corresponding areas with the different frequencies in a single pass and output a rendered image data. In other words, the pixel shader 214 may render at pixel, sample, or other granularity. For example, each 2×2 pixel area is rendered with different resolutions, different objects are rendered at different resolutions, and different screen-space positions are rendered with different resolutions. The second resolution rendering engine 216 resolves the rendered image data into a final output image data with the first resolution according to the second parameter information. The post-Z operation unit 218 may provide a post-shader Z/stencil buffer testing.

Figure 3:
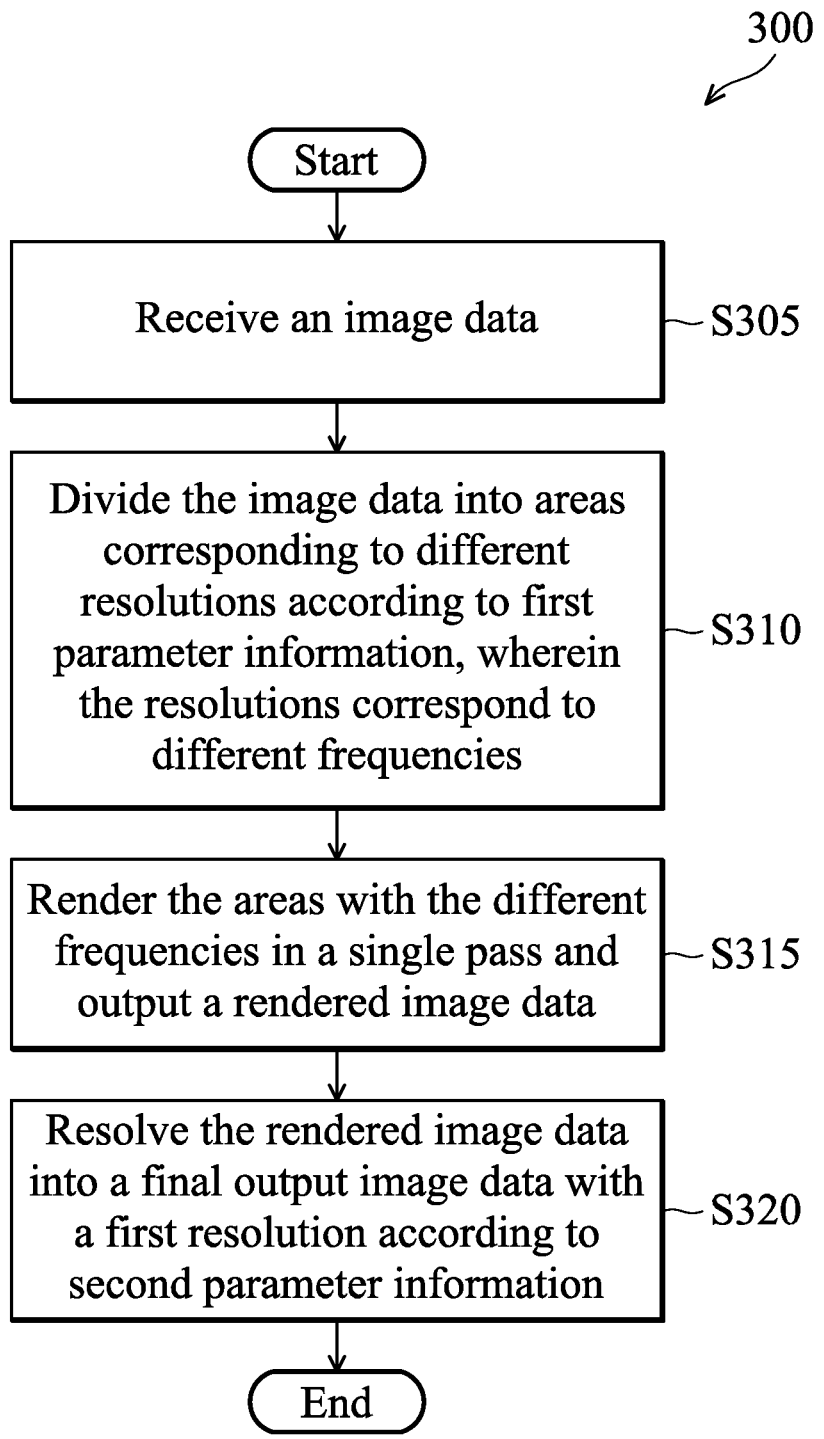
FIG. 3 is a flow diagram illustrating a method for improving image quality by using multi-resolution according to an embodiment of the disclosure.

FIG. 3 is a flow diagram 300 illustrating a method for improving image quality by using multi-resolution according to an embodiment of the disclosure. The method can be performed by the graphics processing unit 120 shown in FIG. 1.

In step S305, the graphics processing unit receives an image data, wherein the image data is a rasterized image and has a first resolution. In step S310, the graphics processing unit divides the image data into areas corresponding to different resolutions according to first parameter information, wherein the resolutions correspond to different frequencies. In step S315, the graphics processing unit renders the areas with the different frequencies in a single pass and outputs a rendered image data. In step S320, the graphics processing unit resolves the rendered image data into a final output image data with a first resolution according to second parameter information.

Another technical problem that can be solved by the present disclosure is to solve the problem of realistic and rapid rendering in the complex image data in a virtual reality device. The realistic and rapid rendering in the complex image data can be applied in movie and game manufacture, virtual simulation, etc.

Figure 4:
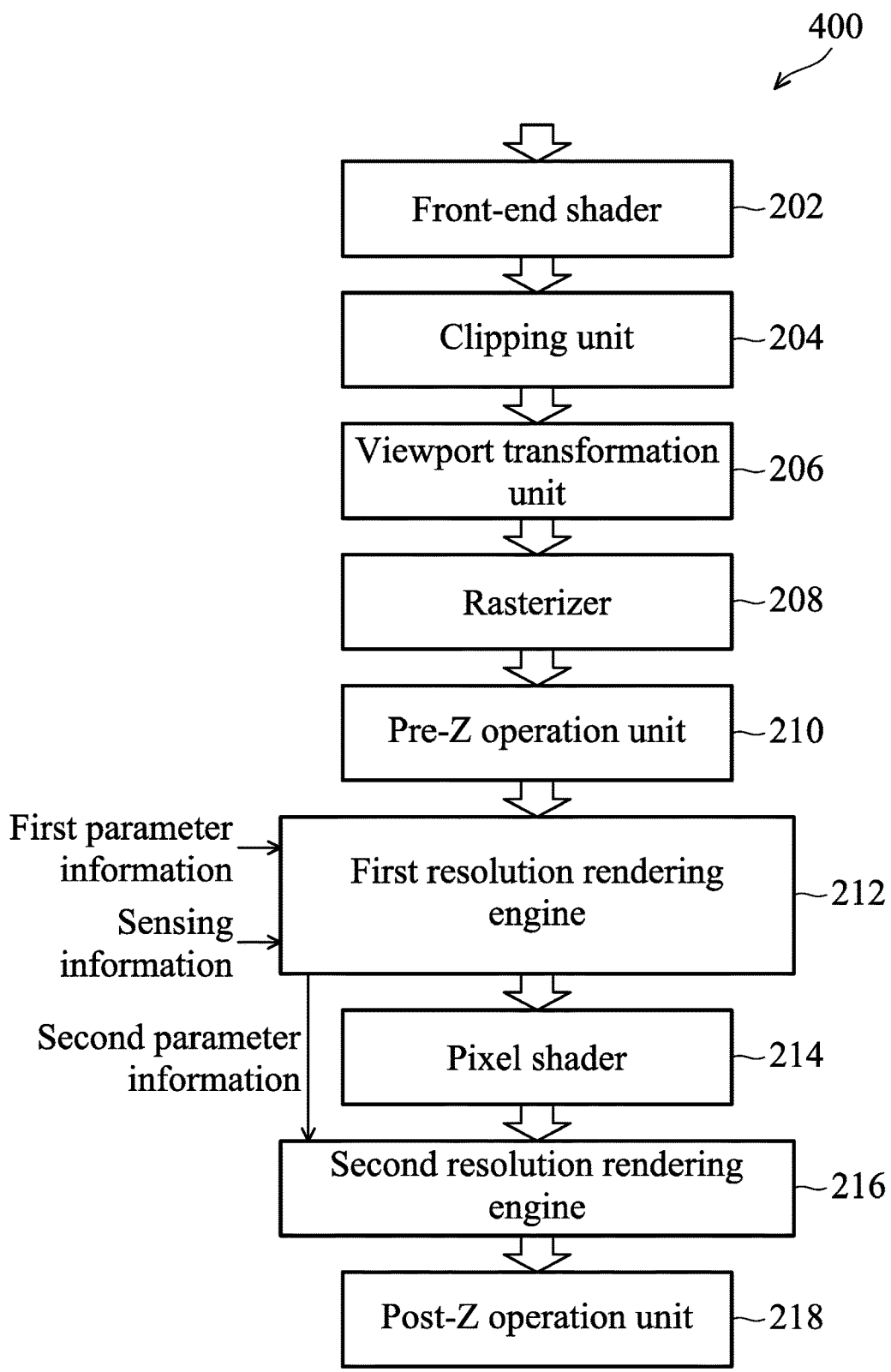
FIG. 4 shows a schematic diagram of a graphics rendering pipeline according to one embodiment of the present disclosure.

FIG. 4 shows a schematic diagram of a graphics rendering pipeline 400 according to one embodiment of the present disclosure. The components having the same name as described in FIG. 2 have the same function, so details related to the functions of the components will be omitted. The main difference between FIG. 4 and FIG. 2 is that the first resolution rendering engine 212 further receives sensing information sensed by a sensor in a virtual reality device, wherein the sensor can be mounted to the exterior of the virtual reality device and be coupled to the processor or the graphics processing unit. In one embodiment, the sensor can be an acceleration sensor and the sensing information is an acceleration value. The sensor can also be a gyro sensor and the sensing information is a rotation angle. In another embodiment, the sensor can be a temperature sensor and the sensing information is a temperature of a processor. The sensor can also be an eye-tracking sensor and the sensing information is an area the eyes focus on.

The first resolution rendering engine 212 can convert the sensed information into a quality level after receiving the sensing information. In the embodiment, the quality level can be divided into 16 levels. The higher the level, the lower the quality. For example, when the acceleration sensor transmits an acceleration value, the first resolution rendering engine 212 converts the acceleration value into a quality level and transmits the quality level to the pixel shader 214. The pixel shader 214 may adjust the rendering frequency and rendering quality according to the quality level. In another example, after the eye-tracking sensor transmits the sensing information indicating the coordinate information of the area the eyes focus on to the first resolution rendering engine 212, the first resolution rendering engine 212 transmits the coordinate information of the area the eyes focus on to the pixel shader 214. The pixel shader 214 may adjust the rendering frequency and rendering quality corresponding to the area the eyes focus on according to the coordinate information of the area the eyes focus on.

Figure 5:
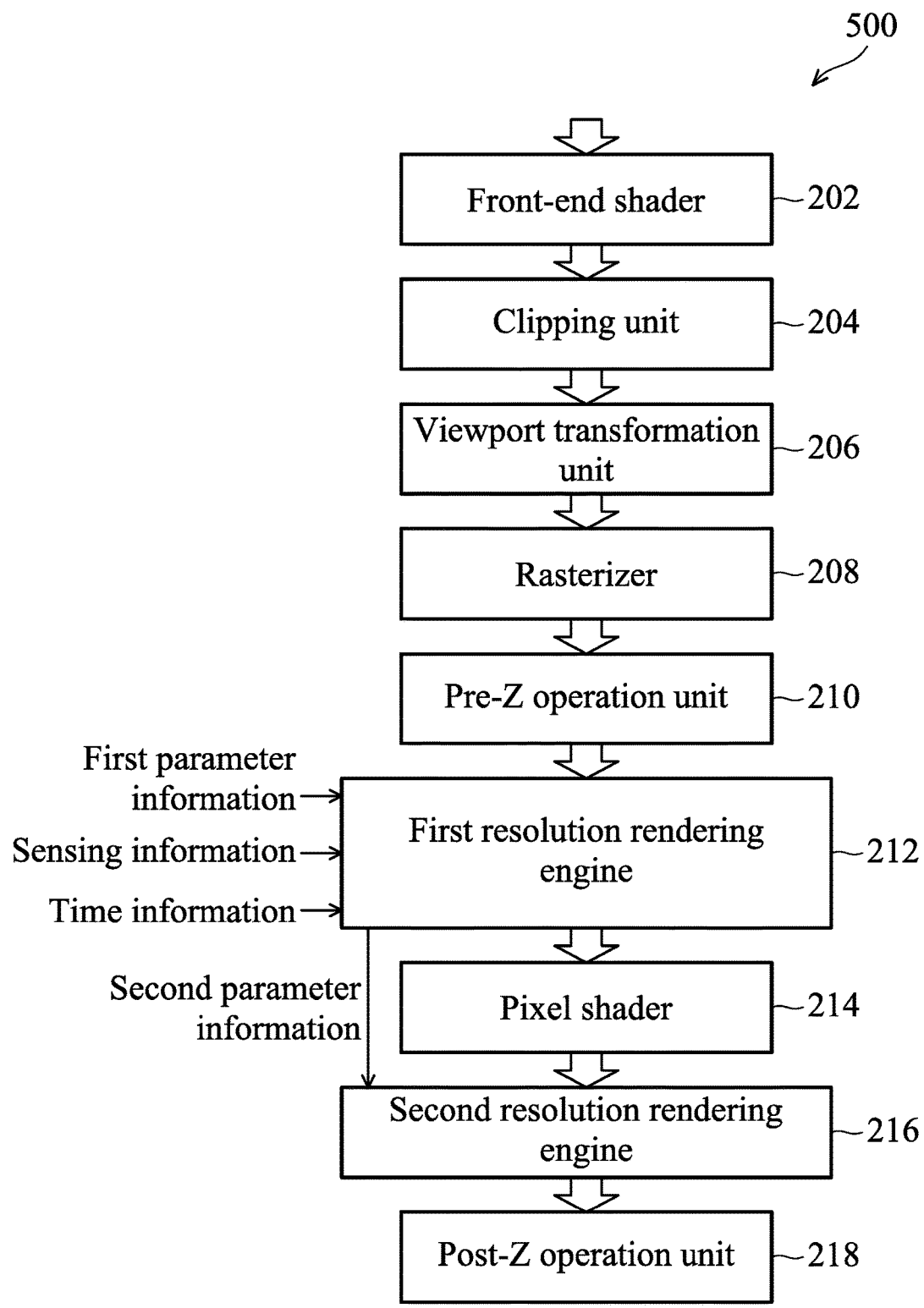
FIG. 5 shows a schematic diagram of a graphics rendering pipeline according to one embodiment of the present disclosure.

FIG. 5 shows a schematic diagram of a graphics rendering pipeline 500 according to one embodiment of the present disclosure. The components having the same name as described in FIG. 4 have the same function, so details related to the functions of the components will be omitted. The main difference between FIG. 5 and FIG. 4 is that the first resolution rendering engine 212 further receives time information generated by a time sensor in the virtual reality device, wherein the time sensor can be mounted to the exterior of the virtual reality device and be coupled to the processor or the graphics processing unit.

The first resolution rendering engine 212 may estimate a finish time of a current frame according to the time information, wherein the time information at least includes a workload of a previous frame, a workload of the current frame and a ratio of a time stamp. The first resolution rendering engine 212 then determines whether the finish time is before a video-synchronizing signal (Vsync). The first resolution rendering engine 212 generates an instruction signal and transmits the instruction signal to the pixel shader 214 to instruct the pixel shader 214 to adjust the resolution, such as, to reduce the resolution.

In another embodiment, when the sensor is a temperature sensor and the first resolution rendering engine 212 estimates that the finish time of the current frame cannot be before the Vsync according to the time information transmitted from the time sensor, the first resolution rendering engine 212 may generate an instruction signal to the processor according to the temperature information of the processor sensed by the temperature sensor. The processor may adjust the current workload to reduce the temperature of the processor and enable the finish time of the current frame to be before the Vsync.

Figure 6:
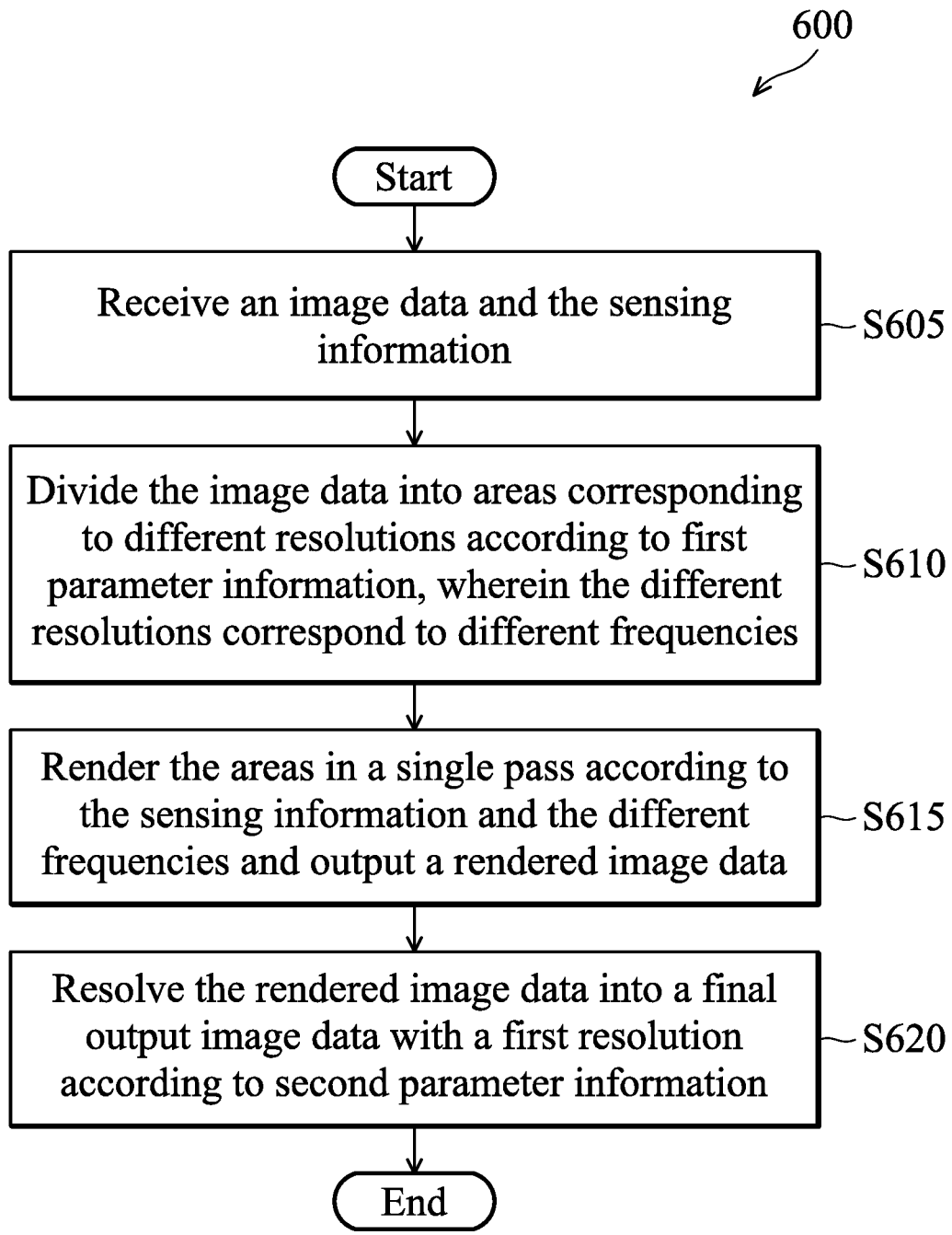
FIG. 6 is a flow diagram illustrating a method for improving image quality according to an embodiment of the disclosure.

FIG. 6 is a flow diagram 600 illustrating a method for improving image quality according to an embodiment of the disclosure. The method can be performed by the graphics processing unit 120 shown in FIG. 1, wherein the graphics processing unit 120 can further receive sensing information sensed by a sensor.

In step S605, the graphics processing unit receives an image data and the sensing information, wherein the image data is a rasterized image and has a first resolution. In step S610, the graphics processing unit divides the image data into areas corresponding to different resolutions according to first parameter information, wherein the different resolutions correspond to different frequencies. In step S615, the graphics processing unit renders the areas in a single pass according to the sensing information and the different frequencies and outputs a rendered image data. In step S620, the graphics processing unit resolves the rendered image data into a final output image data with a first resolution according to second parameter information.

Figure 7:
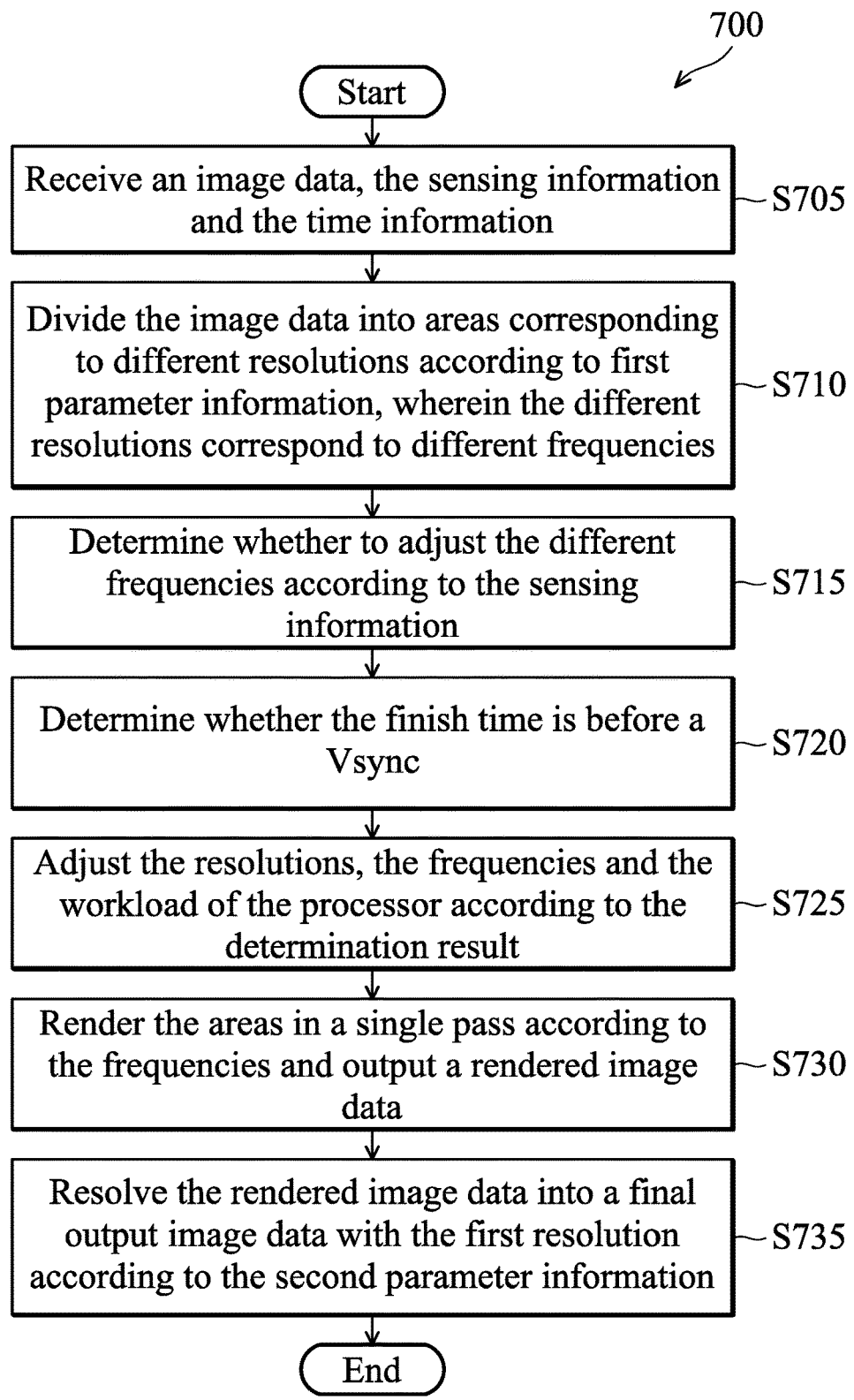
FIG. 7 is a flow diagram illustrating a method for improving image quality according to an embodiment of the disclosure.

FIG. 7 is a flow diagram 700 illustrating a method for improving image quality according to an embodiment of the disclosure. The method can be performed by the graphics processing unit 120 shown in FIG. 1, wherein the graphics processing unit 120 can further receive sensing information sensed by a sensor and time information generated from a time sensor.

In step S705, the graphics processing unit receives an image data, the sensing information and the time information, wherein the image data is a rasterized image and has a first resolution. In step S710, the graphics processing unit divides the image data into areas corresponding to different resolutions according to first parameter information, wherein the different resolutions correspond to different frequencies. In step S715, the graphics processing unit determines whether to adjust the different frequencies according to the sensing information. In step S720, the graphics processing unit determines whether the finish time is before a video-synchronizing signal (Vsync). In step S725, the graphics processing unit adjusts the resolutions, the frequencies and the workload of the processor according to the determination result. In step S730, the graphics processing unit renders the areas in a single pass according to the frequencies and outputs a rendered image data. In step S735, the graphics processing unit resolves the rendered image data into a final output image data with the first resolution according to the second parameter information.

In addition, in the above exemplary device, although the method has been described on the basis of the flow diagram using a series of the steps or blocks, the present disclosure is not limited to the sequence of the steps, and some of the steps may be performed in order different from that of the remaining steps or may be performed simultaneously with the remaining steps. For example, the graphics processing unit may first determine whether the finish time is before the Vsync, and then may adjust the frequencies according to the sensing information. Furthermore, those skilled in the art will understand that the steps shown in the flow diagram are not exclusive and they may include other steps or one or more steps of the flow diagram may be deleted without affecting the scope of the present disclosure.

Therefore, by using the method and device for improving image quality of the present disclosure, the image data can be rendered in a single pass by using different resolutions and frequencies. In addition, the present disclosure may further dynamically adjust the rendering quality according to the sensing information of the sensor of the virtual reality device and may determine whether the rendering time is enough according to the time information generated by the time sensor of the virtual reality device to effectively improve the rendering speed and quality.

In addition, the graphics processing unit 120 in the electrical device 100 can execute the program code in the memory 104 to perform all of the above-described actions and steps or others described herein.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for improving image quality, comprising:
   receiving an image data and sensing information;
   dividing the image data into areas corresponding to different resolutions according to first parameter information, wherein the different resolutions correspond to different frequencies;
   rendering the areas in a single pass according to the sensing information and the different frequencies and outputting a rendered image data with the different resolutions; and
   resolving the rendered image data with the different resolutions into a final output image data with a first resolution according to second parameter information,
   wherein the method further comprising:
   receiving time information from a time sensor;
   estimating a finish time of a current frame according to the time information;
   determining whether the finish time is before a video-synchronizing signal (Vsync); and
   generating an instruction signal to adjust the resolution when the finish time cannot be before the Vsync.

2. The method for improving image quality as claimed in claim 1, wherein the first parameter information is transmitted by a driver, and includes screen coordinate information and distance information.

3. The method for improving image quality as claimed in claim 1, wherein after receiving the sensing information, the method further comprises:
   converting the sensed information into a quality level; and
   rendering the area according to the different frequencies and the quality level, and outputting the rendered image data.

4. The method for improving image quality as claimed in claim 1, wherein the time information at least includes a workload of a previous frame, a workload of the current frame and a ratio of a time stamp.

5. The method for improving image quality as claimed in claim 1, wherein the sensing information is transmitted by a sensor, the sensor is an acceleration sensor, and the sensing information is an acceleration value.

6. The method for improving image quality as claimed in claim 1, wherein the sensing information is transmitted by a sensor, the sensor is a gyro sensor, and the sensing information is a rotation angle.

7. The method for improving image quality as claimed in claim 1, wherein the sensing information is transmitted by a sensor, the sensor is a temperature sensor, and the sensing information is a temperature of a processor.

8. The method for improving image quality as claimed in claim 1, wherein the sensing information is transmitted by a sensor, the sensor is an eye-tracking sensor, and the sensing information is an area the eyes focus on.

9. The method for improving image quality as claimed in claim 1, wherein the image data is a rasterized image.

10. The method for improving image quality as claimed in claim 1, wherein the second parameter information at least includes the first resolution of the image data.

11. A virtual reality device for improving image quality, comprising:
   a graphics processing unit; and
   a memory, operatively coupled to the graphics processing unit;
   wherein the graphics processing unit is configured to execute a program code stored in the memory to execute:
   receiving an image data and sensing information;
   dividing the image data into areas corresponding to different resolutions according to first parameter information, wherein the different resolutions correspond to different frequencies;
   rendering the areas in a single pass according to the sensing information and the different frequencies and outputting a rendered image data with the different resolutions; and
   resolving the rendered image data with the different resolutions into a final output image data with a first resolution according to second parameter information,
   wherein after receiving the sensing information, the graphics processing unit further executes the program code to execute:
   receiving time information from a time sensor;
   estimating a finish time of a current frame according to the time information;
   determining whether the finish time is before a video-synchronizing signal (Vsync); and
   generating an instruction signal to adjust the resolution when the finish time cannot be before the Vsync.

12. The virtual reality device for improving image quality as claimed in claim 11, wherein the first parameter information is transmitted by a driver, and includes screen coordinate information and distance information.

13. The virtual reality device for improving image quality as claimed in claim 11, wherein after receiving the sensing information, the graphics processing unit further executes the program code to execute:
   converting the sensed information into a quality level; and
   rendering the area according to the different frequencies and the quality level, and outputting the rendered image data.

14. The virtual reality device for improving image quality as claimed in claim 11, wherein the time information at least includes a workload of a previous frame, a workload of the current frame and a ratio of a time stamp.

15. The virtual reality device for improving image quality as claimed in claim 11, wherein the sensing information is transmitted by a sensor, the sensor is an acceleration sensor, and the sensing information is an acceleration value.

16. The virtual reality device for improving image quality as claimed in claim 11, wherein the sensing information is transmitted by a sensor, the sensor is a gyro sensor, and the sensing information is a rotation angle.

17. The virtual reality device for improving image quality as claimed in claim 11, wherein the sensing information is transmitted by a sensor, the sensor is a temperature sensor, and the sensing information is a temperature of a processor.

18. The virtual reality device for improving image quality as claimed in claim 11, wherein the sensing information is transmitted by a sensor, the sensor is an eye-tracking sensor, and the sensing information is an area the eyes focus on.

19. The virtual reality device for improving image quality as claimed in claim 11, wherein the image data is a rasterized image.

20. The virtual reality device for improving image quality as claimed in claim 11, wherein the second parameter information at least includes the first resolution of the image data.

\* \* \* \* \*